United States Patent [19]

Windisch

[11] Patent Number: 4,689,997
[45] Date of Patent: Sep. 1, 1987

[54] MOTION DETECTOR SUITABLE FOR DETECTING EARTHQUAKES AND THE LIKE

[76] Inventor: David E. Windisch, 904 Silverspur Rd., Rolling Hills Estates, Calif. 90274

[21] Appl. No.: 813,264
[22] Filed: Dec. 24, 1985
[51] Int. Cl.$^4$ ............................................. G01N 29/00
[52] U.S. Cl. ....................................... 73/652; 73/654; 340/540; 340/690
[58] Field of Search .................. 73/652, 654; 340/540, 340/690

[56] References Cited

U.S. PATENT DOCUMENTS 3,002,062  9/1961  Globe ................................... 73/654
4,363,377  12/1982  Van Gerpen ......................... 73/652

Primary Examiner—Anthony V. Ciarlante
Attorney, Agent, or Firm—Edward A. Sokolski

[57] ABSTRACT

A motion detector for detecting earthquakes or the like provides a warning signal when vibrations having a frequency of the order of the natural frequency of an earthquake tremor are detected. A preferred embodiment of the device employs a vertical spring barb member which is mounted on a suitable support on one end thereof. A coupler member is supported on the other end of the barb member. This coupler member is connected through a coil spring to an inertial mass which is vertically positioned generally in external concentricity with the barb and the coupler, the spring being either compressed or extended to provide a resilient coupling between the coupler member and the inertial mass. The spring and mass elements are chosen so as to have a natural resonant frequency at the frequency of an earthquake tremor (0.7–3 Hz), or other disturbance to be detected. An electrical switching circuit is provided so that when the disturbance to be detected occurs, motion of the inertial mass will cause the electrical switch to close thereby activating a suitable alarm device for providing a warning signal.

11 Claims, 6 Drawing Figures

MOTION DETECTOR SUITABLE FOR DETECTING EARTHQUAKES AND THE LIKE

This invention relates to motion detectors and more particularly, to such a device suitable for detecting disturbances such as earthquakes.

It has been found that earthquakes have particular distinguishing vibration characteristics which identify them from other random vibrations which are normally encountered. Thus, an earthquake tremor involves sudden transient motions or a series of motions of the ground which spread from the point of origin in all directions. Primary or "P" waves which are principally in a vertical direction precede the arrival of secondary, "S" waves which are principally horizontal (i.e. at right angles to the motions of the "P" waves). The "S" waves are generally larger in amplitude than the "P" waves and are potentially the waves that cause the principal destruction to structures. This is in view of the fact that most structures are designed to counteract vertical vibrations, being considerably more vulnerable to shear or lateral forces.

It has been found that "P" waves travel about twice as fast as "S" waves. Therefore, depending upon the distances from the epicenter of an earthquake, "P" waves are received a long enough period before the "S" waves arrive to make their detection significant in providing a warning (about 20 seconds at 70 miles distance). It is well recognized as indicated in prior art U.S. Pat. Nos. 3,813,505 to Shoji, issued 5/28/74 and 4,364,033 issued 12/14/82 to Tasy that earthquakes have both vertical and horizontal components and that there is some horizontal vibration and vertical vibration in both "P" and "S" waves. As indicated above, the "P" waves are principally vertical and the "S" waves principally horizontal. Therefore, earthquake detectors should be sensitive to both vertical and horizontal tremors.

Several problems exist, in providing sufficient sensitivity, particularly to the initial "P" wave vibrations at a moderate distance from the epicenter without going to rather costly detection equipment. Further, it is essential to avoid false alarms that the instrument be sensitive only to earthquake tremors and not to other extraneous vibration signals that appear from time to time.

The device of the present invention overcomes the aforementioned problems in a simple and highly economical instrument. This end result is achieved in the present invention by employing a resonant vibration system which is tuned to the frequency of earthquake tremors (typically the order of 0.7–3 Hz). This resonant circuit may be vibratorily sensitive to both vertical and lateral vibrational forces or may be sensitive only to vertical forces. The preferred embodiment of the present invention is implemented by employing a spring barb member which is anchored at one end thereof. An inertial mass is connected to the spring barb by means of a spring which may be in the form of a coil spring which is either a compression or extension spring. The compliance of the spring barb and the coil spring, and the total mass interconnected therewith, including that of the inertial mass member, and the coupler member, are chosen so as to resonantly vibrate at the frequency to be anticipated from an earthquake tremor in the particular geographical area of operation (typicaly 0.7–3 Hz.). For high sensitivity, a resonant vibration system having low friction (i.e. high "Q") is to be desired and the system of the present invention satisfies these requirements. When an earthquake tremor occurs, the instrument of the present invention is set into resonant vibration and the mass thereof is displaced sufficiently to cause an electrical switch to be actuated, this switch setting off an alarm signal.

It is helpful to the comprehension of this invention to make an analogy between a mechanical resonant circuit and an electrical resonant circuit. This type of analogy is well known to those skilled in the art and is described, for example, in Chapter 2 of "Sonics" by Hueter and Bolt, published in 1955 by John Wiley and Sons. In making such an analogy, force F is equated with electrical voltage E, velocity of vibration u is equated with electrical current i, mechanical compliance Cm is equated with capacitance C, mass M is equated with electrical inductance L, mechanical resistance (friction) Rm is equated with electrical resistance R, and mechanical impedence Zm is equated with electrical impedance Z. Thus, it can be shown that if a member is elastically vibrated by sinusoidal force, Fo sin $\omega$t, being equal to 2 times the frequency of vibration, that $$Zm = Rm + j\left(\omega M - \frac{1}{\omega C_m}\right) = \frac{Fo \sin \omega t}{u} \quad (1)$$

Where $\omega M$ is equal to $(1/\omega Cm)$, a resonant condition exists, and the effective mechanical impedance Zm is equal to the mechanical resistance Rm, the reactive impedance components $\omega M$ and $(1/\omega Cm)$ cancelling each other out. Under such a resonant condition, the velocity of vibration u is at a maximum, effective power factor is unity, and energy is most efficiently delivered to the object being vibrated. It is such a high efficiency resonant condition in the elastic system being driven that is preferably utilized in the device of this invention to achieve the desired end results.

Just as the sharpness of resonance of an electrical circuit is defined as the "Q" thereof, and is indicative of the ratio of energy stored to the energy used in each cycle, so also the Q of a mechanical resonant circuit has the same significance and is equal to the ratio between $\omega M$ and Rm. Thus, high efficiency and considerably cyclic motion can be achieved by designing the mechanical resonant circuit for high Q. The Q can be varied to give broader or narrower frequency response of the mechanical resonant circuit by choice of materials for the circuit and the damping of such circuit.

It is therefore an object of this invention to provide a motion detector of relatively simple and economic construction suitable for providing a warning signal of an earthquake.

It is a further object of this invention to provide an improved earthquake detection system which employs resonant operation to provide high sensitivity and selectivity to earthquake tremors.

Other objects of this invention will become apparent as the description proceeds in connection with the accompanying drawings of which:

Figure 1:
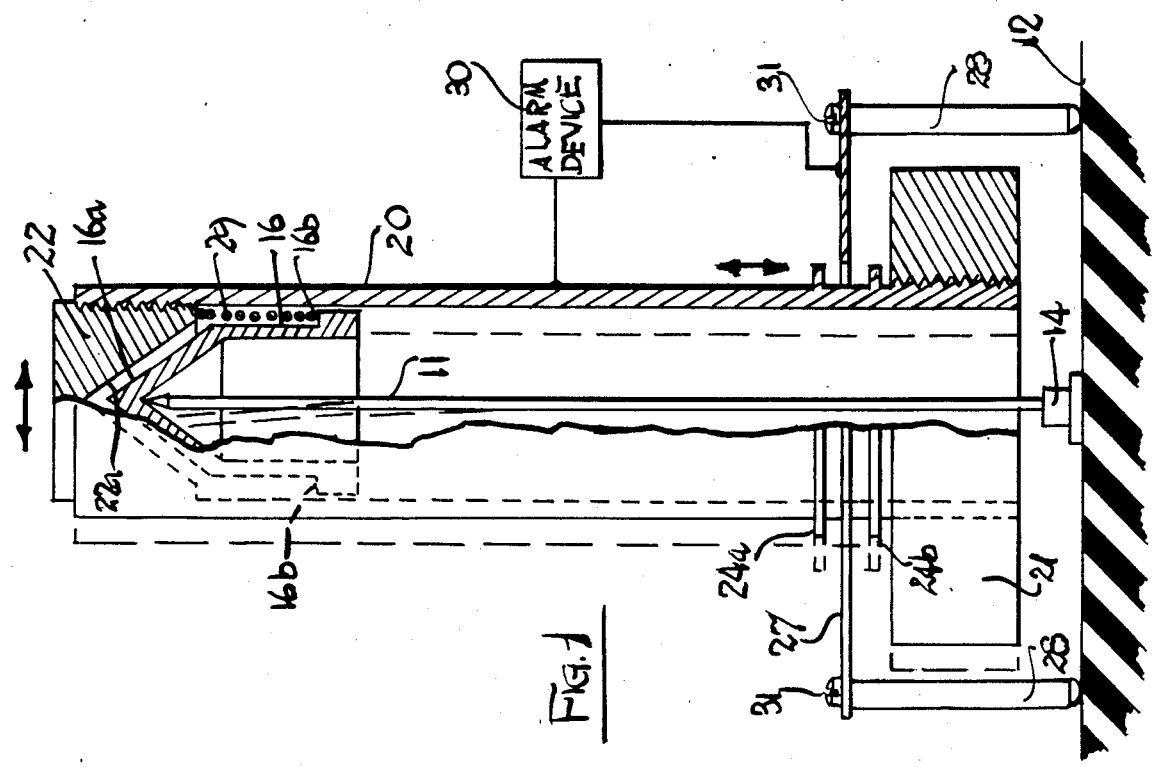
FIG. 1 is an elevational view with partial cut-away section of a first embodiment of the invention.

Referring now to FIG. 1, a first embodiment of the invention is illustrated. Spring barb member 11 is fabricated of a relatively durable, electrically conductive resilient material such as spring stainless steel or beryllium copper and is anchored on the base 12 of the device in support member 14 to which one end of the barb is fixedly attached and which, in turn, is fixedly attached to the base. Base 12 is fabricated of an electrically insulative material such as a suitable plastic. Suspended on the opposite end of spring barb 11 is a conical coupler member 16, the apex of the cone being seated on the end of the barb. Mounted in external concentricity with conical coupler member 16 and not attached thereto is a metal cylindrical sleeve member 20. Fixedly attached to the bottom end of sleeve member 20 as by threadable attachment is ring-shaped inertial mass member 21. An end plug 22 is threadably attached to the top end of cylindrical sleeve member 20 and has an inner conical surface 22a which matches the outer conical surface 16a of coupler member 16. A pair of spaced apart ring-shaped contacts 24a and 24b extend outwardly from the wall of cyclindrical member 20 directly above inertial mass 21. Ring-shaped metal contact plate 27 is mounted in external concentricity with sleeve member 20 on base 12 by means of screws 31 which fit through sleeves 28 and threadably engage the base, there being a space between contacts 24a and 24b and plate 27 and between the wall of cylindrical sleeve member 20 and this contact plate when the instrument is in its rest condition as shown in FIG. 1.

The device is shown in its unactuated at rest condition in FIG. 1. A coil spring 29 is installed in compression between ledge portion 16b of coupler member 16 and the inner wall of plug member 22 such as to resiliently urge member 16 away from plug member 22. The compliances of springs 11 and 29 and the combined total mass of the inertial mass 21 cylindrical member 20, coupler member 16 are chosen to resonate both laterally and vertically at the typical frequency of an earthquake tremor. This frequency will vary in the 0.7–3 Hz. range depending upon the particular geographical operating location. It has been found, for example, that for the Los Angeles area, that this frequency is approximately 1.4 Hz, for a predicted earthquake of sizeable magnitude. Thus, the system will only resonantly vibrate in response to tremors at substantially this frequency and will be relatively insensitive to vibrations at other frequencies. When the resonant vibration of an earthquake "P" wave is received, it will initiate principally vertical, but also horizontal vibration of the system which will effect resonant vibration of the system, thereby greatly amplifying the sensed vibrations. This will cause sufficient motion of the cyclindrical assembly 20 to cause contact 24a or 24b to come into contact with contact plate 27 and/or contact plate 27 to come into contact with the wall of metallic sleeve member 20. This will provide an electrical switching signal to alarm device 30 to close a switching contact in this device, thereby activating alarm device 30 which may comprise a buzzer, warning light, solenoid, etc.

Figure 2:
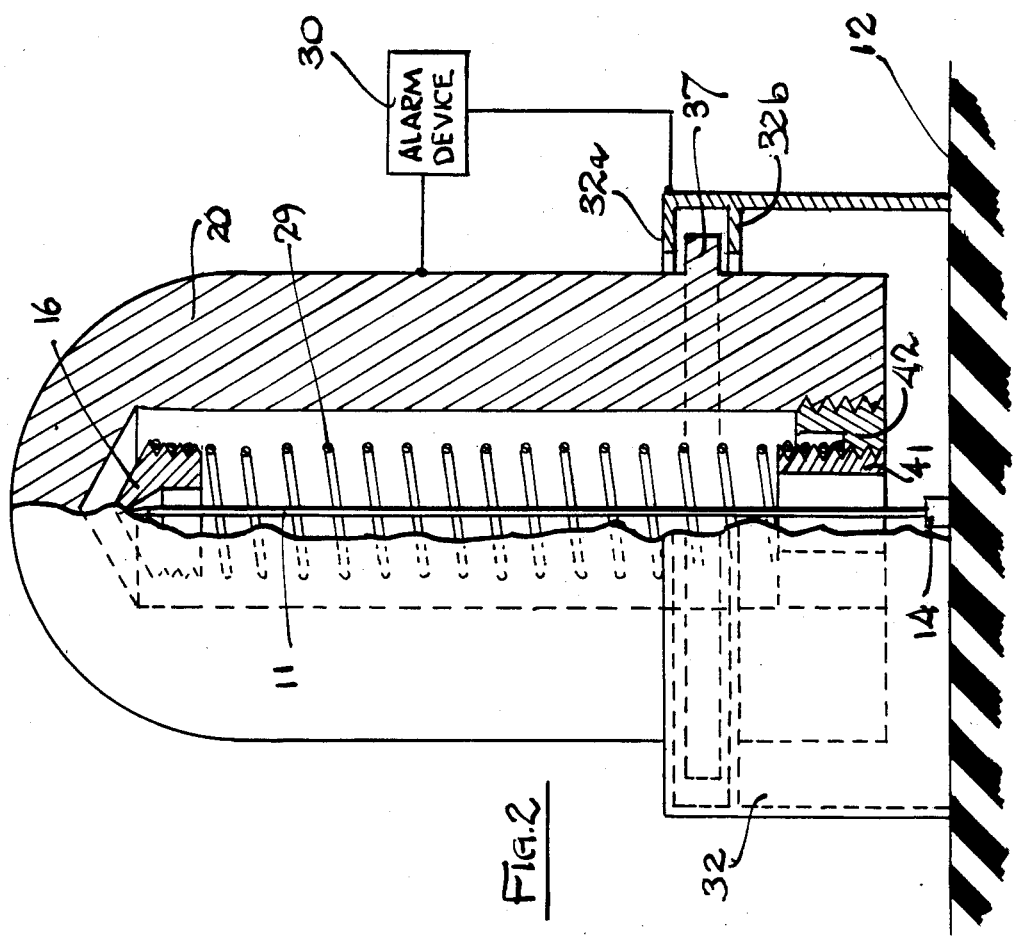
FIG. 2 is an elevational view with partial cut-away section of a second embodiment of the invention.

Referring now to FIG. 2, a second embodiment of the invention is illustrated. This embodiment is similar to the first in its operation except that it employs an extension spring rather than a compression spring, and has a somewhat different physical configuration. As for the first embodiment, spring barb member 11 is fixedly supported on one end thereof by means of a support member 14 which is fixedly attached to electrically insulative base 12. Mounted on base 12 is a cylindrical metal frame 32 which has a pair of spaced apart rings 32a and 32b. Suspended on the top end of barb member 11 is conical coupler member 16. Mounted over coupler member 16 and barb member 11 in external concentricity therewith and not attached thereto is cylindrical sleeve and inertial mass member 20. Extension spring 29 is attached at one end thereof to threaded insert 41 which is attached to the base of cylindrical member 20 by means of threaded coupler 42. The spring is attached at the other end thereof to coupler member 16 such that cylindrical member 20 is resiliently coupled to barb member 11. A contact ring 37 extends outwardly from the wall of cylindrical member 20, this ring being located between contact rings 32a and 32b. As for the previous embodiment, the spring and mass components are chosen so that they form a resonant vibration system for both lateral and vertical vibration at the typical frequency of an earthquake tremor for the geographical area of operation. When the system is set into resonant vibration, contact member 37 will come into contact with one or both of contact members 32a and 32b and/or the inner wall of frame 32 which provides a switching signal for alarm, device 30 so as to activate this alarm device.

Figure 3:
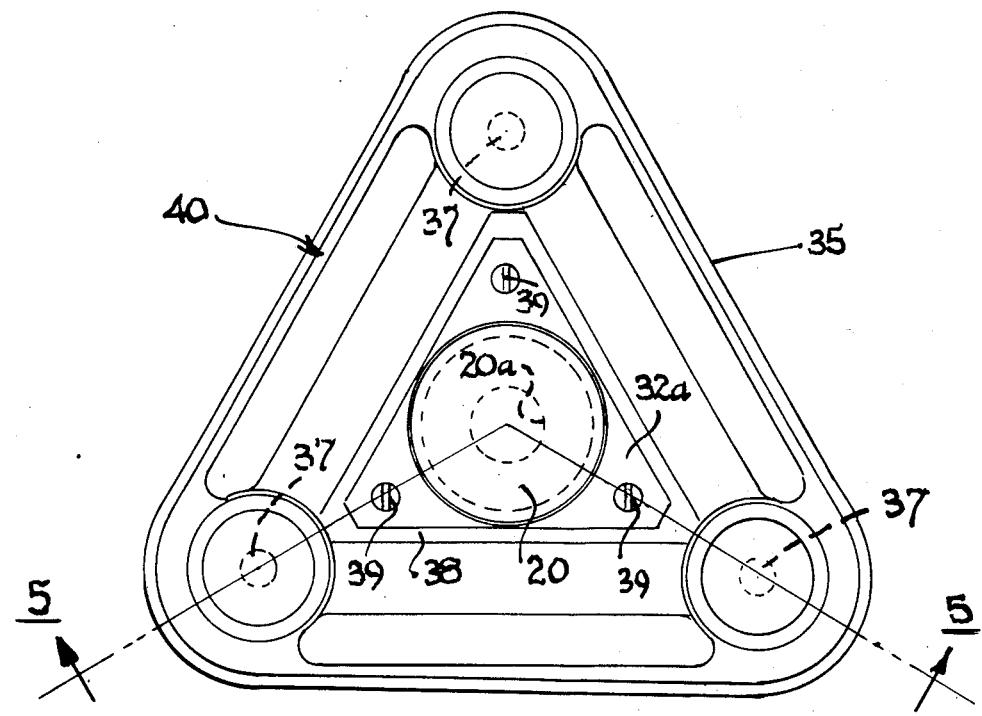
FIG. 3 is a top plan view of a third embodiment of the invention.
Figure 4:
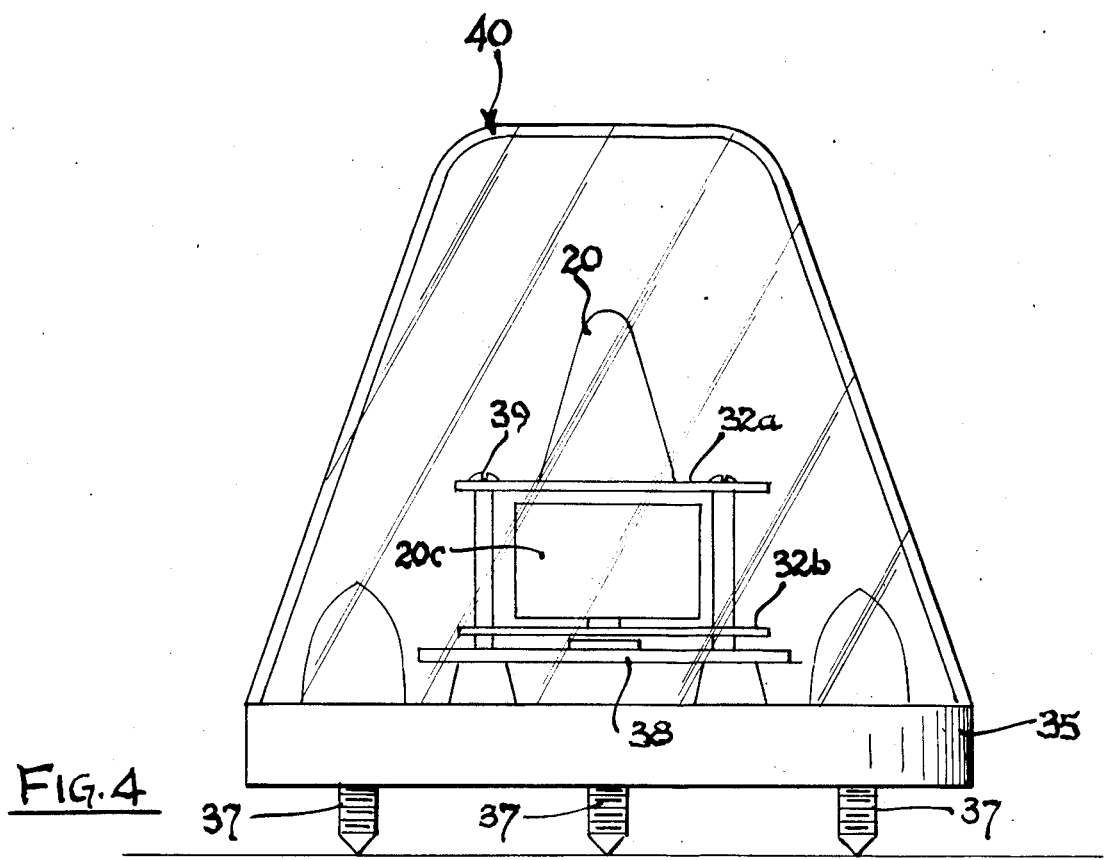
FIG. 4 is a side elevational view of the third embodiment.
Figure 5:
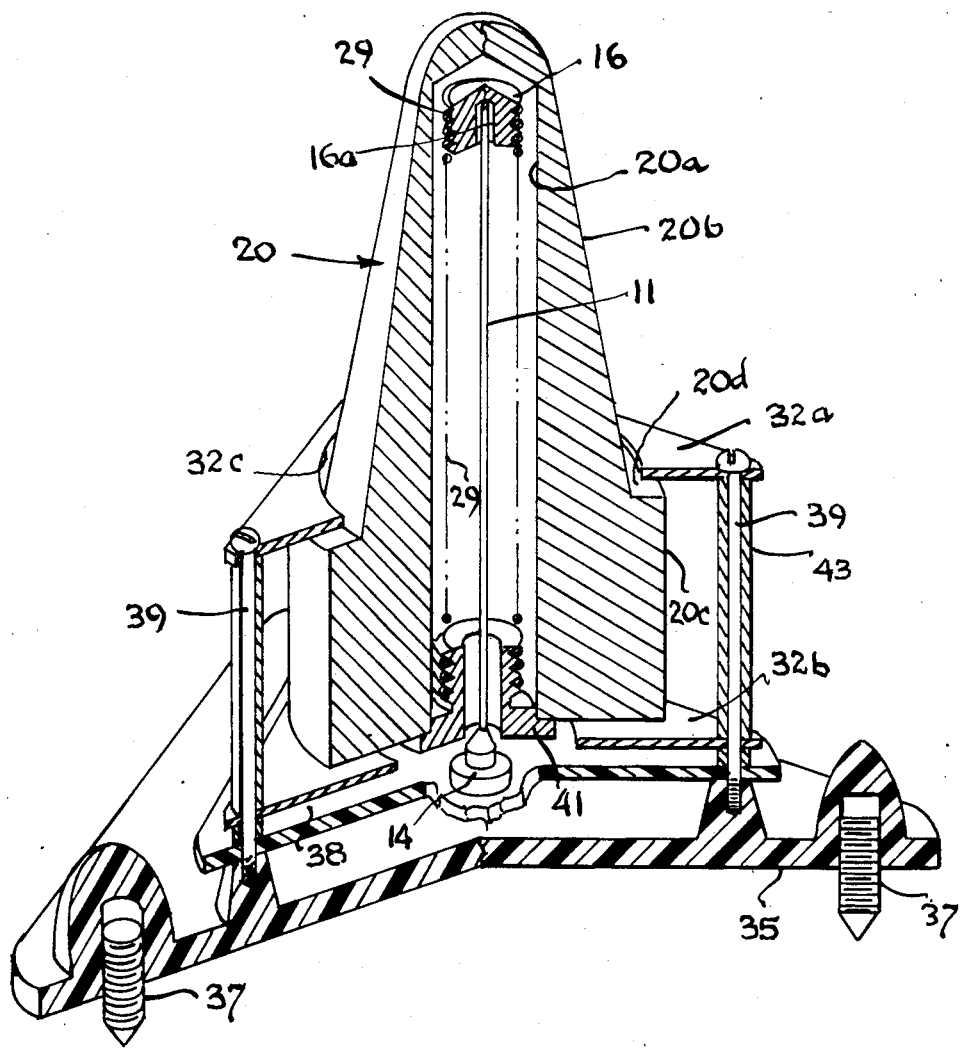
FIG. 5 is a cross-sectional view taken along the plane indicated by 5—5 in FIG. 3.

Referring now to FIGS. 3–5, a further embodiment of the invention is illustrated. This embodiment operates in the same general fashion as the embodiment of FIG. 2, employing an extension coil spring which is extended by a spring barb, these spring members forming a resonant vibration circuit with a mass member which is suspended on the barb and which forms a sleeve which surrounds the barb and coil spring. The structural configuration of this embodiment, however, is somewhat different from that of the prior embodiment. Base portion 35 which may be fabricated of plastic has a removable cover 40 mounted thereon which may be of a transparent plastic. An electrically insulative board 38 is mounted on base 35 by means of screws 39. A base support 14 for spring barb 11 is fixedly attached to board 38. The spring barb is similar in configuration to that described for the previous embodiments. Coil spring 29 is attached at one end thereof to threaded insert member 40 which abuts against the base of inertial mass member 20. Mass member 20 has a hollow interior 20a which forms a sleeve surrounding coil spring 29 and spring barb 11. The upper end of coil spring 29 is attached to coupler member 16 which has a hollow interior 16a. The upper end of spring barb 11 fits within the hollow interior portion 16a of coupler 16 and thus spring 29 is extended within sleeve 20a such that inertial mass member 20 is resiliently supported above board 38 by means of coil spring 29 and spring barb 11. The resonant vibration frequency of the mass and springs and coupler, in combination, are chosen as in the previous embodiments for resonance at the frequency of the tremors to be detected.

Inertial mass 20 has an upper tapering conical portion 20b and a cylindrical base portion 20c, there being a shoulder 20d formed between the upper and base portions.

A pair of electrically conductive plates 32a and 32b are mounted in spaced apart opposing relationship on base member 35 and insulative board 38 by means of screws 39 which have conductive sleeves 43 which act as spacers between plates 32a and 32b. A circular aperture 32c is formed in upper plate 32a and the upper conical portion 20b of the inertial mass is fitted through this aperture with shoulder portion 20d in opposing relationship with plate 32a. The bottom surface of base portion 20c of the inertial mass is spaced from and in opposing relationship with plate 32b. Leveling screws 37 are used to level the base 35 to center inertial mass 20 within aperture 32c. Further, the mass and springs are chosen so that in its resting position the mass is vertically centered between plates 32a and 32b with plate 32a spaced from shoulder 20d and the bottom surface of the mass spaced from plate 32b. Thus, in its at rest condition, electrically conductive mass 20 is electrically insulated from plates 32a and 32b.

Operation of the device is as for the prior embodiments. In response to tremors at the resonant frequency of the system, the mass will vibrate vertically and/or horizontally so that it will come into contact with plate 32a and/or plate 32b, such electrical contact completing a circuit to a switch which will cause an alarm or other warning device to be energized.

The horizontal and vertical sensitivity of the device will vary as a function of the diameter of aperture 32c and the length of conductive spacer 43. Various values for the diameter and length will give different distances between aperture 32c and inertial mass member 20 and between plates 32a and 32b and the shoulder 20d and the bottom surface of the inertial mass member.

Figure 6:
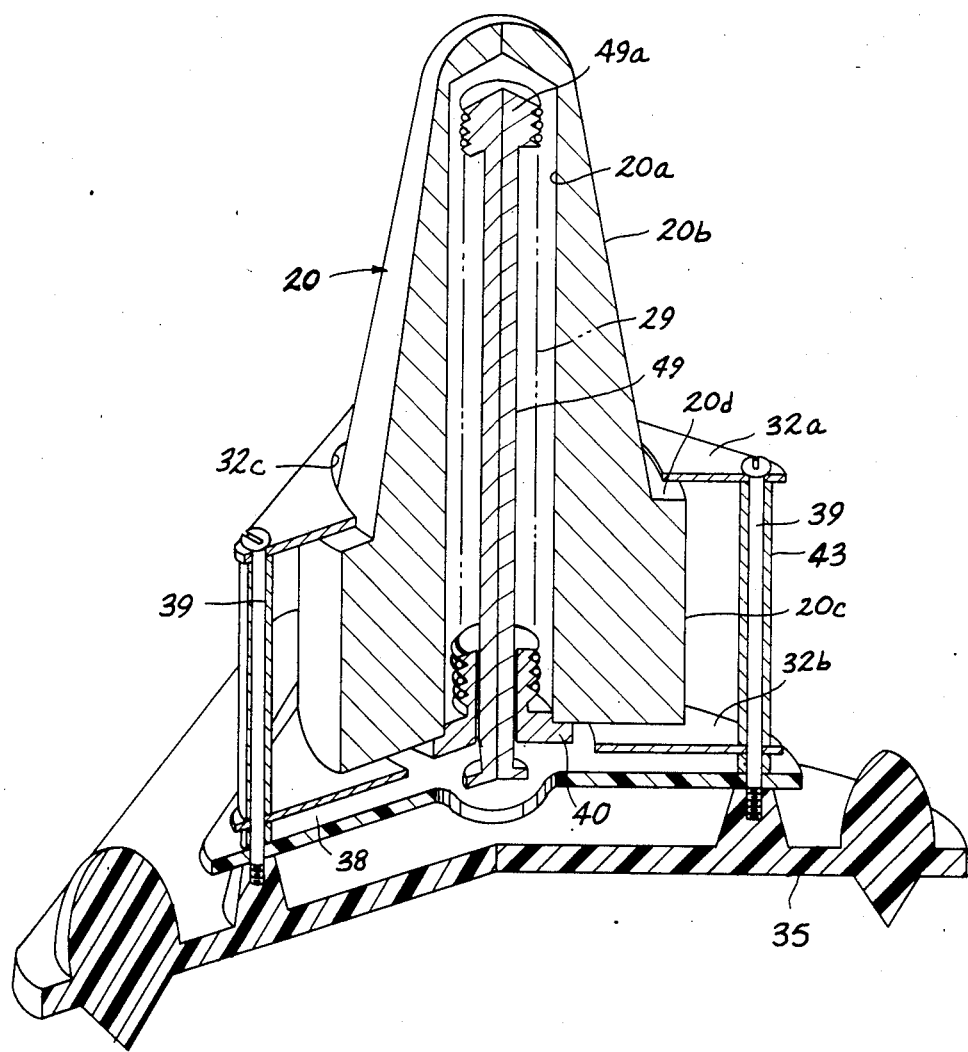
FIG. 6 is a cross-sectional view of a fourth embodiment of the invention.

Referring now to FIG. 6, a further embodiment of the invention is illustrated. This embodiment is sensitive only to earthquake tremors along the vertical axis thereof and is substantially insensitive to horizontal components of such tremors. Construction is generally similar to that of the embodiment of FIGS. 3-5. In this embodiment, however, a rigid post 49 is substituted for barb 11. Threaded sleeve 40 is slidably mounted on post 49, the base of this post being fixedly supported on board 38. The spring 29 is extended between threaded portion 49a on the top of the post and the threaded portion of sleeve 40. As for the previous embodiment, mass 20 is resiliently supported for vertical motion by means of spring 29 by virtue of the abutment of the base of the mass against sleeve 40. The device thus is sensitive principally to vertical disturbances and is resonantly tuned to respond to the vertical components of earthquake tremors of interest. The leveling screws are eliminated in this embodiment.

While the invention has been described and illustrated in detail, it is to be clearly understood that this is intended by way of illustration and example only and is not to be taken by way of limitation, the spirit and scope of this invention being limited only by the terms of the following claims.

I claim:

1. A motion detector device suitable for detecting vibrational tremors such as earthquakes comprising:
    an inertial mass,
    spring means comprising a spring barb oriented principally for motion along a horizontal axis and a coil spring oriented principally for motion along a vertical axis,
    means for resiliently supporting said inertial mass on said spring means for resilient motion along both said horizontal and vertical axes comprising means for anchoring said spring barb at one end thereof and means for connecting said coil spring between the other end of said spring barb and said inertial mass,
    said mass and spring means forming a resonant mechanical vibration circuit at a predetermined vibrational frequency corresponding to that of the vibrational tremor to be detected,
    spaced apart oppositely positioned electrical switching contact means connected to said spring means and said inertial mass respectively, said contact means being brought into switching contact with each other when said vibrational circuit is excited at said predetermined vibrational frequency, and
    alarm means connected to said switching means for providing an alarm signal when the contact means are brought into switching contact.

2. The detector device of claim 1 wherein said spring means comprises a coil spring oriented principally for motion along vertical axis.

3. The detector device of claim 2 wherein the means for supporting the inertial mass on said coil spring comprises a rigid post, means for fixedly supporting said post at one end thereof, a sleeve slidably mounted on said post, the coil spring being attached at one end thereof to said sleeve and at the other end thereof to said post, said mass abutting against said sleeve such that the weight thereof extends said spring and the mass is thereby resiliently supported on the spring.

4. The detector device of claim 1 wherein said means for supporting said inertial mass on said spring means comprises a coupler member mounted on one end of said spring barb, said coil spring being connected between the coupler member and the inertial mass.

5. The detector device of claim 4 wherein said coil spring is retained in compression between the coupler member and the inertial mass.

6. The detector device of claim 4, wherein the coil spring is retained in extension between the coupler member and the inertial mass.

7. The detector device of claim 1 wherein said switching contact means are brought into contact with each other in response to either horizontal or vertical vibrational tremors at said predetermined vibrational frequency.

8. The detector device of claim 4 wherein said predetermined vibrational frequency is 0.7-3 Hz.

9. A motion detector suitable for detecting vibrational tremors such as earthquakes comprising
    a base member,
    upper and lower electrically conductive contact plates,
    means for mounting said plates on said base member in opposing spaced apart relationship above said base member, the upper contact plate having a circular aperture formed therein,
    an electrically insulative support mounted on said base member,
    an electrically conductive spring barb fixedly attached at one end thereof to said insulative support for motion principally along a horizontal axis,
    an electrically conductive inertial mass in the form of a sleeve having an elongated hollow interior, a tapering top portion and a cylindrical base portion,
    a coupler member having a hollow interior,
    a coil spring attached at one end thereof to said coupler member, means for attaching the other end of said coil spring to the base of said inertial mass, said inertial mass being resiliently supported on said spring barb with said coupler member within the hollow interior of the inertial mass and the other end of the spring barb fitted within the hollow interior of the coupler member, the coil spring being extended upwardly by the barb, the cylindrical base portion of the mass being fitted between the contact plates and spaced therefrom and the tapering top portion thereof fitted through the circular aperture of the upper contact plate in spaced relationship thereto, and the inertial mass and the coil and barb springs forming resonant vibration circuits for both vertical and horizontal vibration modes at the frequency of the tremors such that when excited at said frequency the inertial mass is resonantly vibrated thus producing resonance enhanced displacement allowing the inertial mass to come into electrical contact with one or both of the contact plates.

10. The motion detector of claim 9 wherein the base portion of the inertial mass has a top shoulder adjacent to the tapering top portion and a bottom surface, the upper contact plate being spaced from said top shoulder, the lower contact plate being spaced from said bottom surface.

11. The motion detector of claim 9 and further including leveling means mounted on said base member for leveling the detector.

* * * * *